US011315491B2

(12) United States Patent
Yang et al.

(10) Patent No.: US 11,315,491 B2
(45) Date of Patent: Apr. 26, 2022

(54) PIXEL CIRCUIT, DISPLAY PANEL AND DRIVING METHOD

(71) Applicant: BOE TECHNOLOGY GROUP CO., LTD., Beijing (CN)

(72) Inventors: Qian Yang, Beijing (CN); Libin Liu, Beijing (CN); Qiang Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 329 days.

(21) Appl. No.: 16/500,747

(22) PCT Filed: May 13, 2019

(86) PCT No.: PCT/CN2019/086680
§ 371 (c)(1),
(2) Date: Oct. 3, 2019

(87) PCT Pub. No.: WO2019/218972
PCT Pub. Date: Nov. 21, 2019

(65) Prior Publication Data
US 2021/0366395 A1 Nov. 25, 2021

(30) Foreign Application Priority Data

May 14, 2018 (CN) .......................... 201810455140.6

(51) Int. Cl.
*G09G 3/3258* (2016.01)
*G09G 3/3266* (2016.01)
(Continued)

(52) U.S. Cl.
CPC ....... *G09G 3/3258* (2013.01); *G06V 40/1306* (2022.01); *G09G 3/3266* (2013.01);
(Continued)

(58) Field of Classification Search
CPC .. G09G 3/3258; G09G 3/3275; G09G 3/3266; G09G 2354/00; G09G 2300/0842;
(Continued)

(56) References Cited

U.S. PATENT DOCUMENTS

2016/0253541 A1* 9/2016 Yang .................... G09G 3/3233
382/124
2016/0260380 A1 9/2016 Yang
(Continued)

FOREIGN PATENT DOCUMENTS

CN 103218972 A 7/2013
CN 104103239 A 10/2014
(Continued)

*Primary Examiner* — Premal R Patel

(57) ABSTRACT

A pixel circuit, a display panel, and a driving method. The pixel circuit includes a data writing circuit, an ultrasonic acquiring and converting circuit, a storage circuit, a driving circuit, an output control circuit, and a light emitting device. The ultrasonic acquiring and converting circuit converts a received ultrasonic signal into a converted electrical signal, and provides the converted electrical signal to the data writing circuit; the data writing circuit provides the converted electrical signal or a data signal to a first node; the driving circuit provides a recognition signal obtained according to the converted electrical signal or a driving signal to the fourth node; the storage circuit maintains a voltage difference between the first node and the second node stable; the output control circuit provides a level of the fourth node to a third node; the third node outputs the recognition signal.

19 Claims, 10 Drawing Sheets

(51) Int. Cl.
*G09G 3/3275* (2016.01)
*G06V 40/13* (2022.01)

(52) U.S. Cl.
CPC ... *G09G 3/3275* (2013.01); *G09G 2300/0842* (2013.01); *G09G 2354/00* (2013.01)

(58) Field of Classification Search
CPC ... G09G 2300/0861; G09G 2310/0262; G09G 2310/061; G09G 2320/0295; G09G 3/3208; G06K 9/0002; G06V 40/1306
See application file for complete search history.

(56) References Cited

U.S. PATENT DOCUMENTS

| | | |
|---|---|---|
| 2017/0103706 A1 | 4/2017 | Yang et al. |
| 2019/0188444 A1 | 6/2019 | Yang et al. |

FOREIGN PATENT DOCUMENTS

| | | |
|---|---|---|
| CN | 104778923 A | 7/2015 |
| CN | 106875894 A | 6/2017 |
| CN | 107180611 A | 9/2017 |
| CN | 107908310 A | 4/2018 |
| CN | 108682386 A | 10/2018 |
| KR | 1020100054001 A | 5/2010 |
| KR | 20160056386 A | 5/2016 |

\* cited by examiner

PIXEL CIRCUIT, DISPLAY PANEL AND DRIVING METHOD

The present application claims priority to Chinese Patent Application No. 201810455140.6, filed on May 14, 2018, the disclosure of which is incorporated herein by reference in its entirety as part of the present application.

TECHNICAL FIELD

Embodiments of the present disclosure relate to a pixel circuit, a display panel, and a driving method.

BACKGROUND

With the development of display technology, a full screen devices has a large screen-to-body ratio and an ultra-narrow bezel, which can greatly improve the visual effect of the viewer, compared with a device having an ordinary display screen, and thus has received extensive attention. Therefore, in order to meet the requirements of a full screen display, in-screen or under-screen fingerprint recognition technology has become a research focus in this field.

SUMMARY

At least one embodiment of the present disclosure provides a pixel circuit comprising a data writing circuit, an ultrasonic acquiring and converting circuit, a storage circuit, a driving circuit, an output control circuit, and a light emitting device; the ultrasonic acquiring and converting circuit is configured to convert a received ultrasonic signal into a converted electrical signal, and to provide the converted electrical signal to the data writing circuit; the data writing circuit is configured to provide a data signal or the converted electrical signal obtained by the ultrasonic acquiring and converting circuit to a first node under a control of a scanning signal; the driving circuit is configured to provide a driving signal, which is used for driving the light emitting device to emit light, to a fourth node under a control of a level of a second node, or to provide a recognition signal obtained according to the converted electrical signal to the fourth node under the control of the level of the second node; the storage circuit is configured to maintain a voltage difference between the first node and the second node stable; the output control circuit is configured to provide a level of the fourth node to a third node under a control of an output control signal; the third node is configured to output the recognition signal; and a first electrode of the light emitting device is configured to be connected to the third node, and a second electrode of the light emitting device is configured to receive a first voltage signal.

For example, in the pixel circuit provided by an embodiment of the present disclosure, the ultrasonic acquiring and converting circuit is connected to the data writing circuit, the data writing circuit is connected to the first node, the storage circuit is connected to the first node and the second node, the driving circuit is connected to the second node and the fourth node, and the output control circuit is connected to the fourth node and the third node.

For example, in the pixel circuit provided by an embodiment of the present disclosure, the first voltage signal is configured to cause the light emitting device not to emit light in a case where the ultrasonic acquiring and converting circuit provides the converted electrical signal to the data writing circuit.

For example, the pixel circuit provided by an embodiment of the present disclosure further comprising a threshold acquisition circuit, the threshold acquisition circuit is connected to the second node and the fourth node, and is configured to provide the level of the fourth node to the second node under a control of the scanning signal.

For example, the pixel circuit provided by an embodiment of the present disclosure further comprising a first node reset circuit, the first node reset circuit is connected to the first node, and is configured to provide a second voltage signal to the first node under a control of the output control signal or a reset signal.

For example, the pixel circuit provided by an embodiment of the present disclosure further comprising a second node reset circuit, the second node reset circuit is connected to the second node, and is configured to provide a third voltage signal to the second node under a control of the reset signal.

For example, the pixel circuit provided by an embodiment of the present disclosure further comprising a third node reset circuit, the third node reset circuit is connected to the third node, and is configured to provide the third voltage signal to the third node under a control of the scanning signal.

For example, in the pixel circuit provided by an embodiment of the present disclosure, the first node reset circuit comprises a first transistor and a second transistor; a gate electrode of the first transistor is configured to receive the output control signal, a first electrode of the first transistor is configured to receive the second voltage signal, and a second electrode of the first transistor is connected to the first node; a gate electrode of the second transistor is configured to receive the reset signal, a first electrode of the second transistor is configured to receive the second voltage signal, and a second electrode of the second transistor is connected the first node.

For example, in the pixel circuit provided by an embodiment of the present disclosure, the second node reset circuit comprises a seventh transistor; a gate electrode of the seventh transistor is configured to receive the reset signal, a first electrode of the seventh transistor is configured to receive the third voltage signal, and a second electrode of the seventh transistor is connected to the second node.

For example, in the pixel circuit provided by an embodiment of the present disclosure, the third node reset circuit comprises an eighth transistor; a gate electrode of the eighth transistor is configured to receive the scanning signal, a first electrode of the eighth transistor is configured to receive the third voltage signal, and a second electrode of the eighth transistor is connected to the third node.

For example, in the pixel circuit provided by an embodiment of the present disclosure, the data writing circuit comprises a fourth transistor; a gate electrode of the fourth transistor is configured to receive the scanning signal, a first electrode of the fourth transistor is connected to the ultrasonic acquiring and converting circuit and configured to receive the data signal, and a second electrode of the fourth transistor is connected to the first node.

For example, in the pixel circuit provided by an embodiment of the present disclosure, the storage circuit comprises a storage capacitor, a first electrode of the storage capacitor is connected to the first node, and a second electrode of the storage capacitor is connected to the second node.

For example, in the pixel circuit provided by an embodiment of the present disclosure, the driving circuit comprises a third transistor; a gate electrode of the third transistor is connected to the second node, a first electrode of the third transistor is configured to receive a fourth voltage signal, and a second electrode of the third transistor is connected to the fourth node.

For example, in the pixel circuit provided by an embodiment of the present disclosure, the threshold acquisition circuit comprises a fifth transistor; a gate electrode of the fifth transistor is configured to receive the scanning signal, a first electrode of the fifth transistor is connected to the fourth node, and a second electrode of the fifth transistor is connected to the second node.

For example, in the pixel circuit provided by an embodiment of the present disclosure, the output control circuit comprises a sixth transistor; a gate electrode of the sixth transistor is configured to receive the output control signal, a first electrode of the sixth transistor is connected to the fourth node, and a second electrode of the sixth transistor is connected to the third node.

For example, the pixel circuit provided by an embodiment of the present disclosure further comprising a light emitting control circuit, the light emitting control circuit is configured to provide a level of the third node to the light emitting device under a control of a light emitting control signal.

For example, in the pixel circuit provided by an embodiment of the present disclosure, the light emitting control circuit comprises a ninth transistor; a gate electrode of the ninth transistor is configured to receive the light emitting control signal, a first electrode of the ninth transistor is connected to the third node, a second electrode of the ninth transistor is connected to the first electrode of the light emitting device.

At least one embodiment of the present disclosure further provides a display panel comprising a display area, the display area comprises a fingerprint recognition area in which the pixel circuit according to an embodiment of the present disclosure is disposed.

For example, the display panel provided by an embodiment of the present disclosure further comprising a scanning signal line, a data signal line, and a reading signal line, the scanning signal line is configured to provide the scanning signal, the data signal line is configured to provide the data signal, and the reading signal line is configured to read the recognition signal.

At least one embodiment of the present disclosure further provides a method for driving the pixel circuit, and the method comprises: during an acquisition and conversion phase, causing the data writing circuit to provide the converted electrical signal obtained by the ultrasonic acquiring and converting circuit to the first node; and during an output phase, causing the driving circuit and the output control circuit to be turned on, providing, by the driving circuit, the recognition signal obtained according to the converted electrical signal to the fourth node, and providing, by the output control circuit, the level of the fourth node to the third node.

At least one embodiment of the present disclosure further provides a method for driving the pixel circuit, and the method comprises: during a reset phase, causing the first node reset circuit to provide the second voltage signal to the first node under the control of the reset signal, and causing the second node reset circuit to provide the third voltage signal to the second node under the control of the reset signal; during an acquisition and conversion phase, causing the data writing circuit to provide the converted electrical signal obtained by the ultrasonic acquiring and converting circuit to the first node, causing the threshold acquisition circuit to write a threshold voltage of the driving circuit to the second node, and causing the third node reset circuit to provide the third voltage signal to the third node under the control of the scanning signal; during an output phase, causing the first node reset circuit to provide the second voltage signal to the first node under the control of the output control signal, causing the driving circuit and the output control circuit to be turned on, providing, by the driving circuit, the recognition signal obtained according to the converted electrical signal to the fourth node, and providing, by the output control circuit, the level of the fourth node to the third node.

At least one embodiment of the present disclosure further provides a method for driving the display panel, and the method comprises: causing the pixel circuit in the fingerprint recognition area to perform a display operation and a fingerprint recognition operation respectively during different time periods.

DETAILED DESCRIPTION

In order to make objects, technical details and advantages of the embodiments of the present disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Methods for implementing fingerprint recognition include capacitive sensing, optical detecting, pressure sensing, ultrasonic detection, etc. Ultrasonic detecting is favored by more and more users because of its advantages of no contact, no blocking and high precision.

In an ultrasonic fingerprint recognition, a high-frequency sound wave is generated through a high-voltage driving circuit, the sound wave can penetrate the epidermis layer of the skin and generate a reflected wave, and then the reflected wave is converted into an electrical signal and provided to an echo acquisition circuit for processing, thereby obtaining a fingerprint image.

Figure 1:
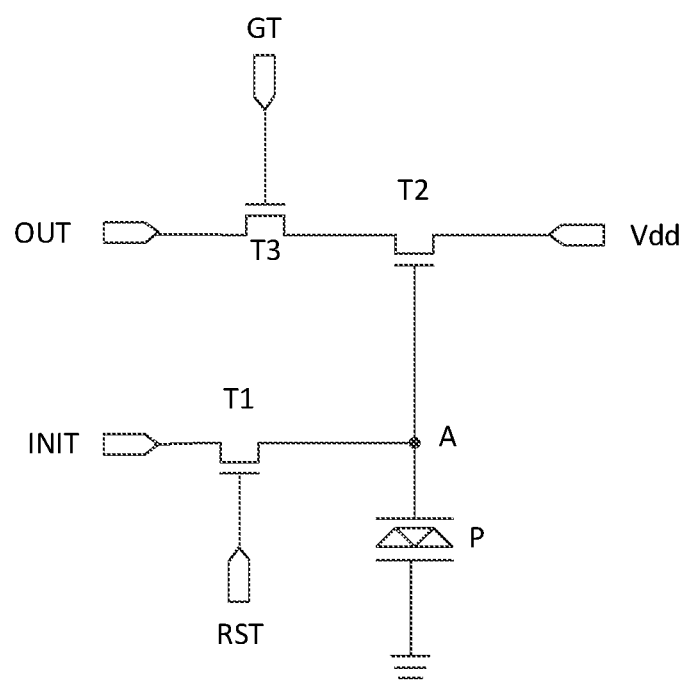
FIG. 1 is a circuit diagram of an echo acquisition circuit.

FIG. 1 shows an echo acquisition circuit. As shown in FIG. 1, in the echo acquisition circuit, during a reset phase, a reset transistor T1 is turned on in response to a reset control signal RST, and the turned-on reset transistor T1 provides a reset voltage signal INIT to a node A, so that the node A can be reset; during a writing and outputting phase, an echo acquisition conversion circuit P converts the received reflected wave into a converted electrical signal and provides it to a gate electrode of a driving transistor T2, the converted electrical signal may control the extent to which the driving transistor T2 is turned on. An electrode of the driving transistor T2 further receives a power voltage signal Vdd, an output transistor T3 is turned on in response to a scanning signal GT, the driving transistor T2 may generate a driving current according to the power voltage signal Vdd and the converted electrical signal, and the driving current is output to an output terminal OUT through the turned-on output transistor T3, for example, the driving current may be provided to a processing circuit at the back end for further processing, so that a fingerprint image required for fingerprint recognition may be obtained.

However, the echo acquisition circuit shown in FIG. 1 cannot compensate for the threshold voltage of the driving transistor T2, and the echo acquisition circuit cannot be used together with the existing pixel circuit and thus is an additional circuit structure. Therefore, the thickness of the display panel or the width of the bezel is greatly increased, which is disadvantageous for the realization of the full screen design and slimming of the display panel, and also increases the overall costs of the display panel.

Embodiments of a pixel circuit, a display panel, and a driving method provided by embodiments of the present disclosure will be described below with reference to the accompanying drawings.

Figure 2A:
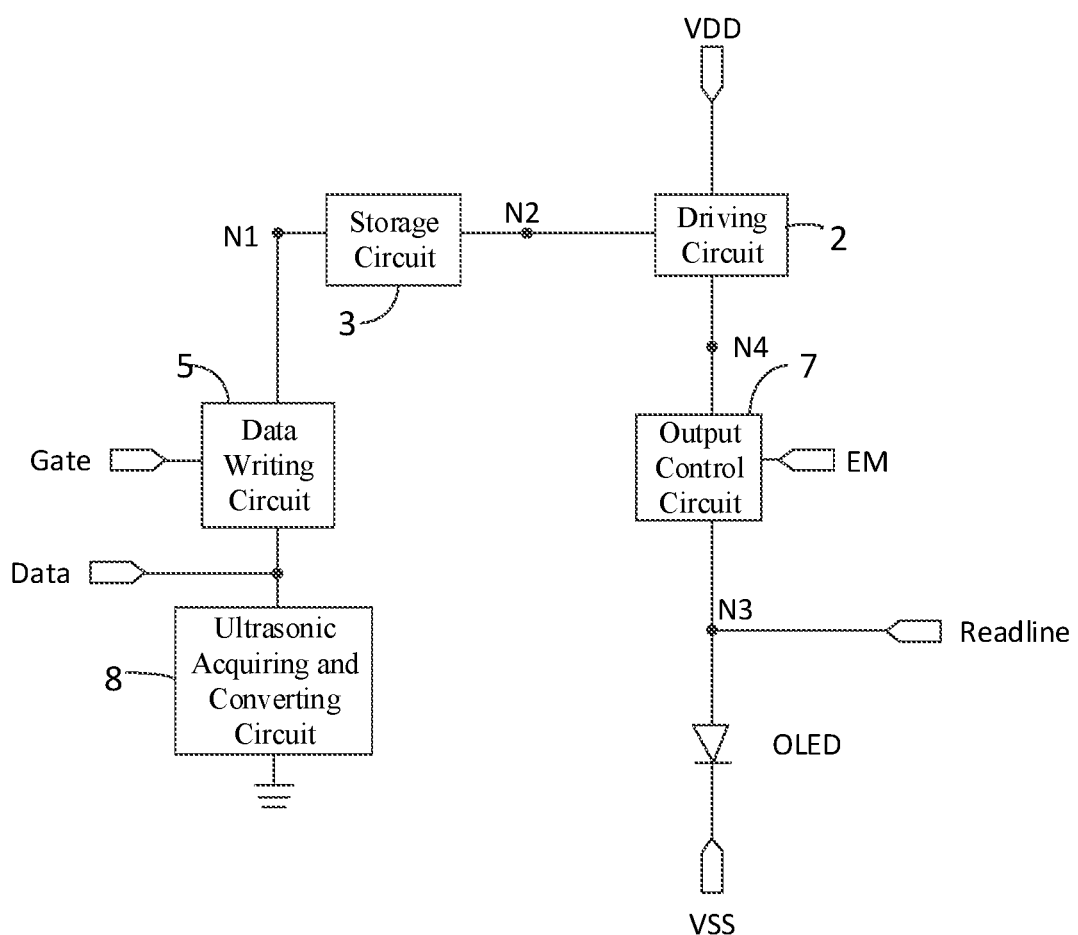
FIG. 2A is a schematic diagram of a pixel circuit provided by at least one embodiment of the present disclosure.

At least one embodiment of the present disclosure provides a pixel circuit. As shown in FIG. 2A, the pixel circuit includes a data writing circuit 5, an ultrasonic acquiring and converting circuit 8, a storage circuit 3, a driving circuit 2, an output control circuit 7, and a light emitting device OLED.

As shown in FIG. 2A, the ultrasonic acquiring and converting circuit 8 is connected to the data writing circuit 5, the data writing circuit 5 is also connected to a first node N1, and the storage circuit 3 is connected to the first node N1 and a second node N2, and the driving circuit 2 is connected to the second node N2 and a fourth node N4, the output control circuit 7 is connected to the fourth node N4 and a third node N3.

The ultrasonic acquiring and converting circuit 8 is configured to convert the received ultrasonic signal into a converted electrical signal and provide the converted electrical signal to the data writing circuit 5. It should be noted that, in the embodiment of the present disclosure, for the sake of clarity and conciseness, the electrical signal obtained after the ultrasonic acquiring and converting circuit 8 performs the conversion is referred to as the converted electrical signal, and this is the same case for the following embodiments, which will not repeated hereinafter.

The data writing circuit 5 is configured to provide the converted electric signal obtained by the ultrasonic acquiring and converting circuit or a data signal Data to the first node N1 under the control of a scanning signal Gate.

The driving circuit 2 is configured to provide a driving signal for driving the light emitting device OLED to emit light to the fourth node N4 under the control of the level of the second node N2 or provide a recognition signal obtained according to the converted electric signal to the fourth node N4. For example, the driving circuit 2 is configured to receive a fourth voltage signal VDD.

The storage circuit 3 is configured to stabilize the voltage difference between the first node N1 and the second node N2.

The output control circuit 7 is configured to provide the level of the fourth node N4 to the third node N3 under the control of an output control signal EM. The third node N3 is configured to output the recognition signal. For example, the recognition signal may be read by a reading signal line Readline connected to the third node N3.

A first electrode of the light emitting device OLED is configured to be connected to the third node N3, and a second electrode of the light emitting device OLED is configured to receive a first voltage signal VSS. For example, the first electrode of the light emitting device OLED may be an anode, and the second electrode of the light emitting device OLED may be a cathode. For example, the light emitting device OLED may be of various types, such as a top emission type, a bottom emission type, or the like, and may emit red, green, blue, or white light, etc., which is not limited by the embodiment of the present disclosure.

The above pixel circuit provided by the embodiment of the present disclosure includes the data writing circuit 5, the ultrasonic acquiring and converting circuit 8, the storage circuit 3, the driving circuit 2, the output control circuit 7, and the light emitting device OLED. By integrating the ultrasonic acquiring and converting circuit 8 in the pixel circuit, the ultrasonic acquiring and converting circuit 8 can share other circuits (for example, the data writing circuit 5, the storage circuit 3, the driving circuit 2, and the output control circuit 7) in the pixel circuit, thereby avoiding an increase in the thickness and costs of the display panel caused by additionally arranging the ultrasonic acquiring and converting circuit 8, and improving or avoiding the disadvantages of a complicated bonding process and low yield. In addition, by integrating the ultrasonic acquiring and converting circuit 8 in the pixel circuit, the design of, for example, the fingerprint recognition area in the display panel can be made more flexible.

It should be noted that, when the pixel circuit is used to drive the light emitting device OLED to emit light and the fourth voltage signal VDD is a high voltage signal, the first voltage signal VSS is a low voltage signal, so that a voltage difference can be formed between the first electrode and the second electrode of the light emitting device OLED to ensure that the light emitting device OLED can be driven to emit light. Certainly, in other embodiments, when the fourth voltage signal VDD is a low voltage signal, the first voltage signal VSS is a high voltage signal, which is not limited by the embodiment of the present disclosure.

For example, in the pixel circuit provided by some embodiments of the present disclosure, the first voltage signal VSS is configured to cause the light emitting device OLED not to emit light when the ultrasonic acquiring and converting circuit 8 provides the converted electrical signal to the data writing circuit 5.

When the pixel circuit is used for the fingerprint recognition operation, in order to prevent the light emitting device OLED from emitting light, the level of the first voltage signal VSS requires being adjusted. For example, the level of the first voltage signal VSS may be adjusted to be the same as or close to the level of the fourth voltage signal VDD, so that a voltage difference formed between the first electrode and the second electrode (the anode and the cathode) of the light emitting device OLED is insufficient to cause the light emitting device OLED to emit light.

In addition, in the above-described pixel circuit provided by the embodiment of the present disclosure, the ultrasonic acquiring and converting circuit 8 is configured to convert the ultrasonic signal reflected back by the fingerprint into the converted electrical signal and provide the converted electrical signal to the data writing circuit 5. For example, the ultrasonic acquiring and converting circuit 8 can convert the ultrasonic signal into the converted electrical signal by using PVDF (polyvinylidene fluoride). Of course, other materials can be used to convert the ultrasonic signal, and the material used may be selected according to actual conditions, which is not limited by the embodiments of the present disclosure.

Figure 2B:
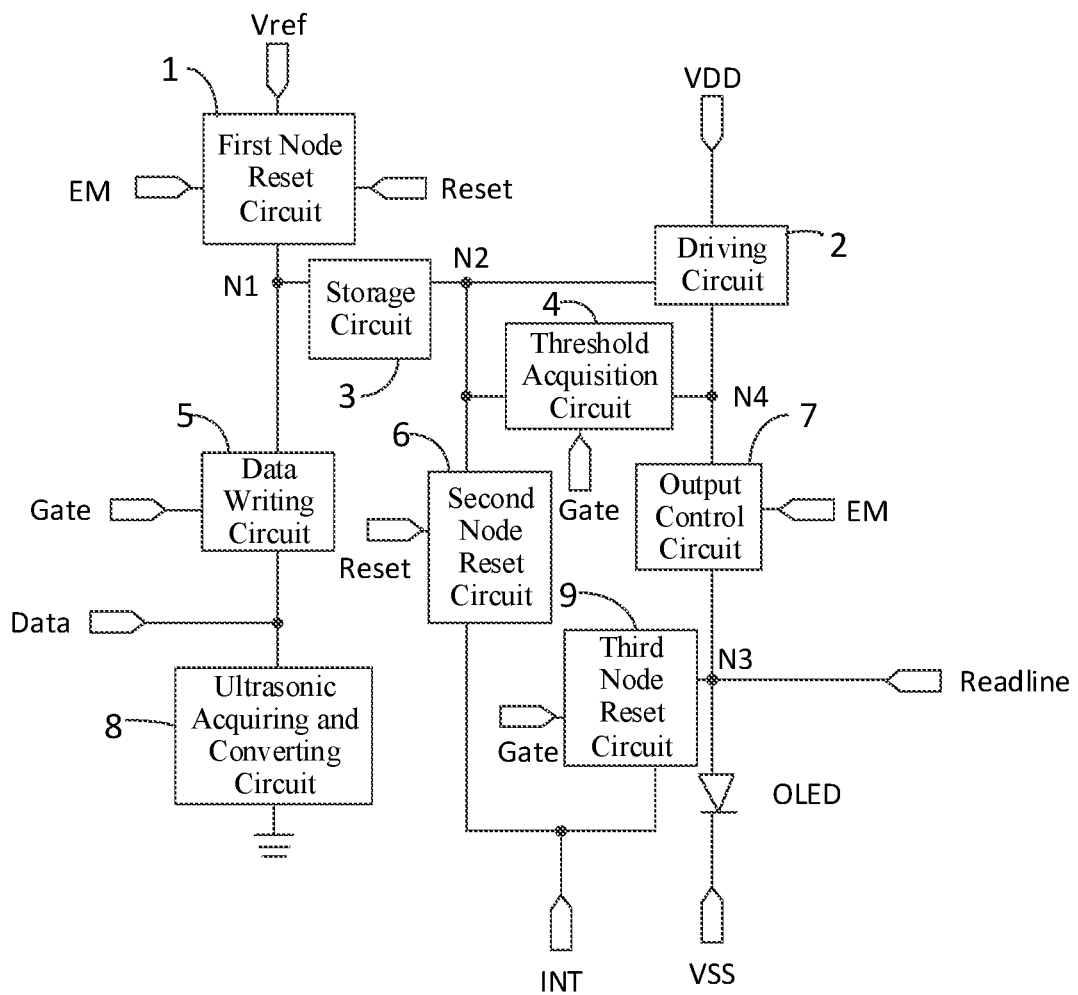
FIG. 2B is a schematic diagram of another pixel circuit provided by at least one embodiment of the present disclosure.

As shown in FIG. 2B, the pixel circuit provided by some embodiments of the present disclosure further includes a threshold acquisition circuit 4. The threshold acquisition circuit 4 is connected to the second node N2 and the fourth node N4, and is configured to provide the level of the fourth node N4 to the second node N2 under the control of a scanning signal Gate. In the embodiment of the present disclosure, by arranging the threshold acquisition circuit 4, for example, the threshold voltage of the driving circuit 2 can be compensated for, so that the influence of the threshold voltage of the driving circuit 2 on the pixel circuit can be avoided.

As shown in FIG. 2B, the pixel circuit provided by some embodiments of the present disclosure further includes a first node reset circuit 1. The first node reset circuit 1 is connected to the first node N1, and is configured to provide a second voltage signal Vref to the first node N1 under the control of the output control signal EM or a reset signal Reset. For example, the first node reset circuit 1 is configured to receive the second voltage signal Vref, and when the first node reset circuit 1 is turned on under the control of the output control signal EM or the reset signal Reset, the received second voltage signal Vref may be provided to the first node N1, thereby completing the reset of the first node N1. For example, the level of the second voltage signal Vref may be between the level of the fourth voltage signal VDD and the level of the first voltage signal VSS, or may be equal to the level of the first voltage signal VSS.

As shown in FIG. 2B, the pixel circuit provided by some embodiments of the present disclosure further includes a second node reset circuit 6. The second node reset circuit 6 is connected to the second node N2 and is configured to provide a third voltage signal INT to the second node N2 under the control of the reset signal Reset. For example, the second node reset circuit 6 is configured to receive the third voltage signal INT, and when the second node reset circuit 6 is turned on under the control of the reset signal Reset, the received third voltage signal INT may be provided to the second Node N2, thereby completing the resetting of the second node N2. For example, the level of the third voltage signal INT may be between the level of the fourth voltage signal VDD and the level of the first voltage signal VSS, or may be equal to the level of the first voltage signal VSS.

As shown in FIG. 2B, the pixel circuit provided by some embodiments of the present disclosure further includes a third node reset circuit 9. The third node reset circuit 9 is connected to the third node N3, and is configured to provide the third voltage signal INT to the third node N3 under the control of the scanning signal Gate. For example, the third node reset circuit 9 is configured to receive the third voltage signal INT, and when the third node reset circuit 9 is turned on under the control of the scanning signal Gate, the received third voltage signal INT may be provided to the third node N3, thereby completing the resetting of the third node N3. Because the first electrode (for example, the anode) of the light emitting device OLED is electrically connected to the third node N3, resetting the third node N3 is resetting the light emitting device OLED.

The pixel circuit provided by some embodiments of the present disclosure may reset the levels of the first node N1, the second node N2, and the third node N3 by arranging the first node reset circuit 1, the second node reset circuit 6, and the third node reset circuit 9, respectively, so that the levels of the first node N1, the second node N2, and the third node N3 can be better controlled.

Figure 3:
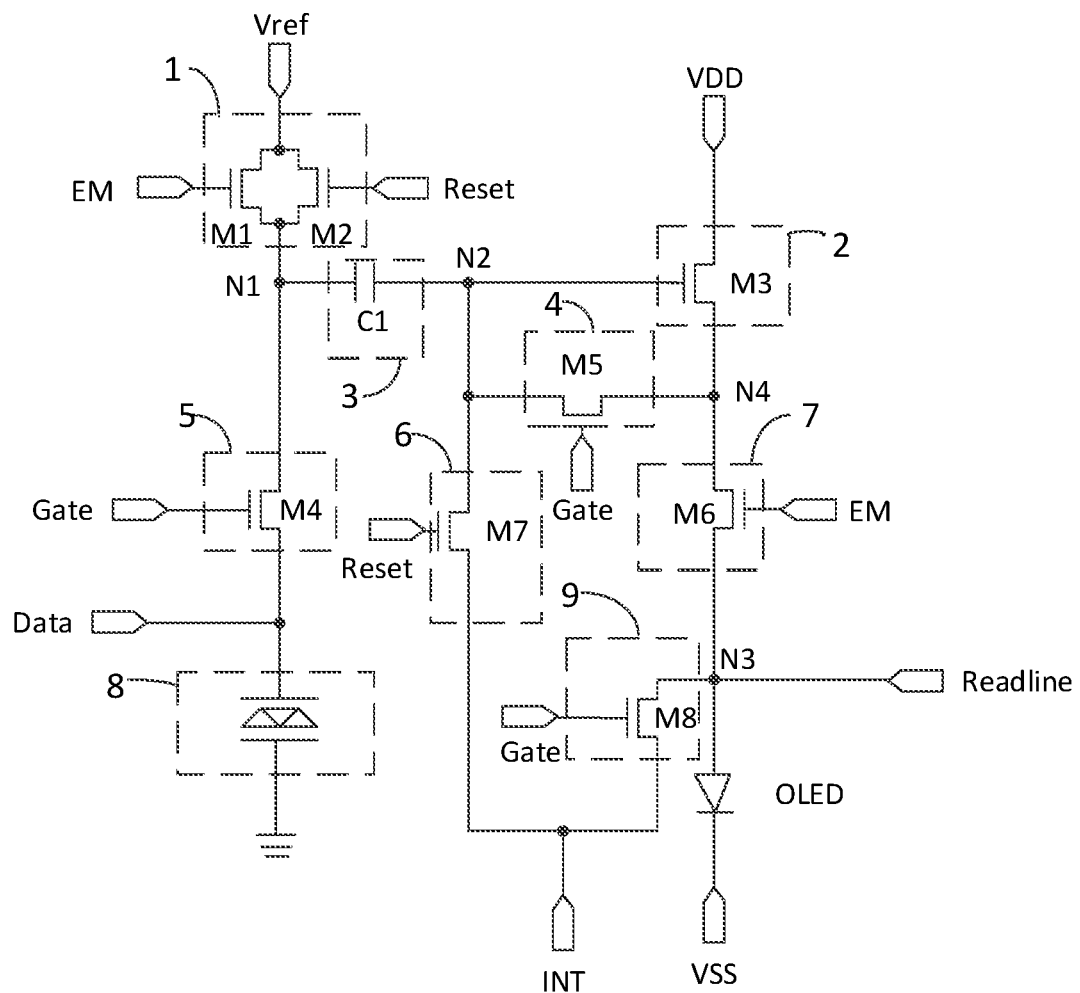
FIG. 3 is a circuit diagram of an implementation of the corresponding pixel circuit shown in FIG. 2B.
Figure 7:
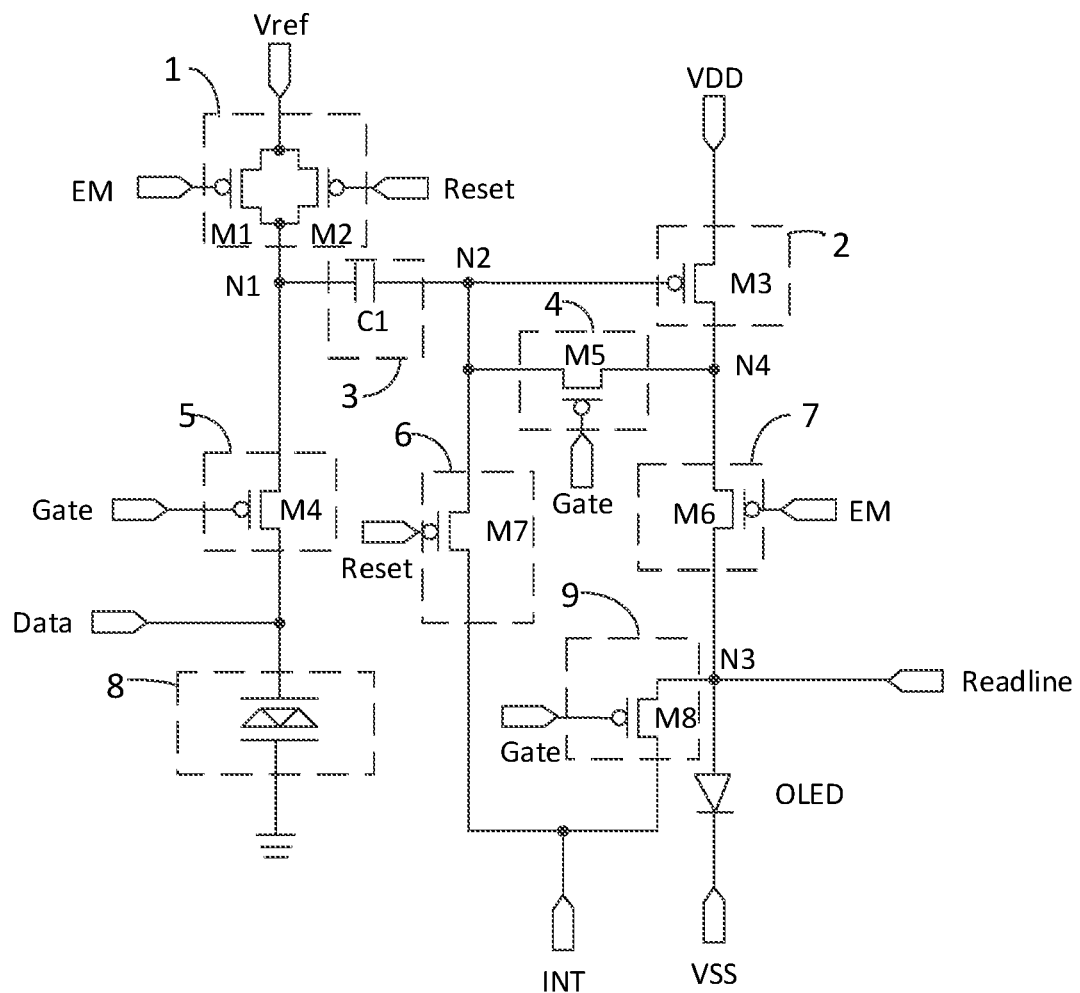
FIG. 7 is a circuit diagram of another corresponding implementation of the pixel circuit shown in FIG. 2B.

For example, in some embodiments, the pixel circuit shown in FIG. 2B can be implemented as the circuit structure shown in FIG. 3 or 7.

For example, as shown in FIGS. 3 and 7, the first node reset circuit 1 includes a first transistor M1 and a second transistor M2.

A gate electrode of the first transistor M1 is configured to receive the output control signal EM, a first electrode of the first transistor M1 is configured to receive the second voltage signal Vref, and a second electrode of the first transistor M1 is connected to the first node N1.

A gate electrode of the second transistor M2 is configured to receive the reset signal Reset, a first electrode of the second transistor M2 is configured to receive the second voltage signal Vref, and a second electrode of the second transistor M2 is connected to the first node N1.

It should be noted that the transistors adopted in the embodiment of the present disclosure may all be TFTs or field-effect transistors (FETs) or other switching elements with the same characteristics. Description is given in the embodiment of the present disclosure by taking the case where the transistors are all P-type transistors as an example. The source electrode and the drain electrode of a transistor adopted here may be symmetrical in structure, so the source electrode and the drain electrode of the transistor may have no difference in structure. In the embodiments of the present disclosure, in order to distinguish two electrodes of the transistor except the gate electrode, one electrode is directly described as the source electrode and the other electrode is directly described as the drain electrode. For example, when the transistor in the embodiment of the present disclosure is an N-type transistor, the first electrode may be the drain electrode and the second electrode may be the source electrode; when the transistor in the embodiment of the present disclosure is a P-type transistor, the first electrode may be the source electrode and the second electrode may be the drain electrode.

For example, in the pixel circuit provided by the embodiment of the present disclosure, as shown in FIG. 3, the first transistor M1 may be an N-type transistor. In this case, the first transistor M1 is in an on state when the output control signal EM is at a high level, and the first transistor M1 is in an off state when the output control signal EM is at a low level. In addition, in other embodiments, as shown in FIG. 7, the first transistor M1 may also be a P-type transistor. In this case, the first transistor M1 is in an on state when the output control signal EM is at a low level, and the first transistor M1 is in an off state when the output control signal EM is at a high level; the embodiment of the present disclosure does not limit the type of the first transistor M1.

For example, in the pixel circuit provided by the embodiment of the present disclosure, as shown in FIG. 3, the second transistor M2 may be an N-type transistor. In this case, the second transistor M2 is in an on state when the reset signal Reset is at a high level, and the second transistor M2 is in an off state when the reset signal Reset is at a low level. In addition, in other embodiments, as shown in FIG. 7, the second transistor M2 may also be a P-type transistor. In this case, the second transistor M2 is in an on state when the reset signal Reset is at a low level, and the second transistor M2 is in an off state when the reset signal Reset is at a high level; the embodiment of the present disclosure does not limit the type of the second transistor M2.

In the pixel circuit provided by the embodiment of the present disclosure, the first transistor M1 is turned on under the control of the output control signal EM, and the second voltage signal Vref is provided to the first node N1, so that the level of the first node N1 can be reset; the second transistor M2 is turned on under the control of the reset signal Reset, and the second voltage signal Vref is provided to the first node N1, so that the level of the first node N1 can be reset.

For example, as shown in FIGS. 3 and 7, the second node reset circuit 6 includes a seventh transistor M7.

A gate electrode of the seventh transistor M7 is configured to receive the reset signal Reset, a first electrode of the seventh transistor M7 is configured to receive the third voltage signal INT, and a second electrode of the seventh transistor M7 is connected to the second node N2.

For example, in the pixel circuit provided by the embodiment of the present disclosure, as shown in FIG. 3, the seventh transistor M7 may be an N-type transistor. In this case, the seventh transistor M7 is in an on state when the reset signal Reset is at a high level, and the seventh transistor M7 is in an off state when the reset signal Reset is at a low level. In addition, in other embodiments, as shown in FIG. 7, the seventh transistor M7 may also be a P-type transistor. In this case, the seventh transistor M7 is in an on state when the reset signal Reset is at a low level, and the seventh transistor M7 is in an off state when the reset signal Reset is at a high level; the embodiment of the present disclosure does not limit the type of the seventh transistor M7.

It should be noted that, in the pixel circuit provided by the embodiment of the present disclosure, the second transistor M2 and the seventh transistor M7 are both turned on under the control of the reset signal Reset, i.e., the second transistor M2 and the seventh transistor M7 are controlled by the same signal, and the second transistor M2 and the seventh transistor M7 are of the same type, that is, the second transistor M2 and the seventh transistor M7 are simultaneously turned on or turned off.

For example, as shown in FIGS. 3 and 7, the third node reset circuit 9 includes an eighth transistor M8.

A gate electrode of the eighth transistor M8 is configured to receive the scanning signal Gate, a first electrode of the eighth transistor M8 is configured to receive the third voltage signal INT, and a second electrode of the eighth transistor M8 is connected to the third node N3.

For example, in the pixel circuit provided by the embodiment of the present disclosure, as shown in FIG. 3, the eighth transistor M8 may be an N-type transistor. In this case, the eighth transistor M8 is in an on state when the scanning signal Gate is at a high level, and the eighth transistor M8 is in an off state when the scanning signal Gate is at a low level. In addition, in other embodiments, as shown in FIG. 7, the eighth transistor M8 may also be a P-type transistor. At this time, the eighth transistor M8 is in an on state when the scanning signal Gate is at a low level, and the eighth transistor M8 is in an off state when the scanning signal Gate is at a high level; the embodiment of the present disclosure does not limit the type of the eighth transistor M8.

For example, as shown in FIGS. 3 and 7, the data writing circuit 5 includes a fourth transistor M4.

A gate electrode of the fourth transistor M4 is configured to receive the scanning signal Gate, a first electrode of the fourth transistor M4 is connected to the ultrasonic acquiring and converting circuit 8 and is configured to receive the data signal Data, and the second electrode of the fourth transistor M4 is connected to the first node N1.

For example, in the pixel circuit provided by the embodiment of the present disclosure, as shown in FIG. 3, the fourth transistor M4 may be an N-type transistor. In this case, the fourth transistor M4 is in an on state when the scanning signal Gate is at a high level, and the fourth transistor M4 is in an off state when the scanning signal Gate is at a low level. In addition, in other embodiments, as shown in FIG. 7, the fourth transistor M4 may also be a P-type transistor. At this time, the fourth transistor M4 is in an on state when the scanning signal Gate is at a low level, and the fourth transistor M4 is in an off state when the scanning signal Gate is at a high level; the embodiment of the present disclosure does not limit the type of the fourth transistor M4.

For example, in the pixel circuit provided by the embodiment of the present disclosure, taking the case where the fourth transistor M4 is an N-type transistor as an example, the fourth transistor M4 is turned on when the scanning signal Gate is at a high level. When the pixel circuit is used to drive the light emitting device OLED to emit light, the data writing circuit 5 (fourth transistor M4) provides the data signal Data to the first node N1, and when the pixel circuit is used for the fingerprint recognition operation, the data writing circuit 5 (fourth transistor M4) provides the converted electric signal obtained after the ultrasonic acquiring and converting circuit 8 performs the conversion to the first node N1. Which signal is provided to the first node N1 by the turned-on fourth transistor M4 depends on the function currently implemented by the pixel circuit.

For example, as shown in FIGS. 3 and 7, the storage circuit 3 includes a storage capacitor C1. A first electrode of the storage capacitor C1 is connected to the first node N1, and a second electrode of the storage capacitor C1 is connected to the second node N2. By providing the storage capacitor C1 between the first node N1 and the second node N2, the voltage difference between the first node M1 and the second node N2 can be maintained stable by the characteristics of the storage capacitor C1.

For example, as shown in FIGS. 3 and 7, the driving circuit 2 includes a third transistor M3.

A gate electrode of the third transistor M3 is connected to the second node N2, a first electrode of the third transistor M3 is configured to receive the fourth voltage signal VDD, and a second electrode of the third transistor M3 is connected to the fourth node N4.

For example, in the pixel circuit provided by the embodiment of the present disclosure, as shown in FIG. 3, the third transistor M3 may be an N-type transistor. In this case, the third transistor M3 is in an on state when the level of the second node N2 is at a high level, and the third transistor M3 is when the level of the second node N2 is at a low level. In addition, in other embodiments, as shown in FIG. 7, the third transistor M3 may also be a P-type transistor. In this case, the third transistor M3 is in an on state when the level of the second node N2 is at a low level, and the third transistor M3 is in an off state when the level of the second node N2 is at a high level; the embodiment of the present disclosure does not limit the type of the third transistor M3.

For example, as shown in FIGS. 3 and 7, the threshold acquisition circuit 4 includes a fifth transistor M5.

A gate electrode of the fifth transistor M5 is configured to receive the scanning signal Gate, a first electrode of the fifth transistor M5 is connected to the fourth node N4, and a second electrode of the fifth transistor M5 is connected to the second node N2.

For example, in the pixel circuit provided by the embodiment of the present disclosure, as shown in FIG. 3, the fifth transistor M5 may be an N-type transistor. In this case, the fifth transistor M5 is in an on state when the scanning signal Gate is at a high level, and the fifth transistor M5 is in an off state when the scanning signal Gate is at a low level. In addition, in other embodiments, as shown in FIG. 7, the fifth transistor M5 may also be a P-type transistor. In this case, the fifth transistor M5 is in an on state when the scanning signal Gate is at a low level, and the fifth transistor M5 is in an off state when the scanning signal Gate is at a high level; the embodiment of the present disclosure does not limit the type of the fifth transistor M5.

It should be noted that, in the pixel circuit provided by the embodiment of the present disclosure, the fourth transistor M4, the fifth transistor M5, and the eighth transistor M8 are all turned on under the control of the scanning signal Gate, i.e., the fourth transistor M4, the fifth transistor M5, and the eighth transistor M8 are controlled by the same signal, and the fourth transistor M4, the fifth transistor M5, and the eighth transistor M8 are of the same type, that is, the fourth transistor M4, the fifth transistor M5, and the eighth transistor M8 are simultaneously turned on or turned off.

For example, as shown in FIGS. 3 and 7, the output control circuit 7 includes a sixth transistor M6.

A gate electrode of the sixth transistor M6 is configured to receive the output control signal EM, a first electrode of the sixth transistor M6 is connected to the fourth node N4, and a second electrode of the sixth transistor M6 is connected to the third node N3.

For example, in the pixel circuit provided by the embodiment of the present disclosure, as shown in FIG. 3, the sixth transistor M6 may be an N-type transistor, and in this case, the sixth transistor M6 is in an on state when the output control signal EM is at a high level, and the sixth transistor M6 is in an off state when the output control signal EM is at a low level. In addition, in other embodiments, as shown in FIG. 7, the sixth transistor M6 may also be a P-type transistor. In this case, the sixth transistor M6 is in an on state when the output control signal EM is at a low level, and the sixth transistor M6 is in an off state when the output control signal EM is at a high level; the embodiment of the present disclosure does not limit the type of the sixth transistor M6.

It should be noted that, in the pixel circuit provided by the embodiment of the present disclosure, the first transistor M1 and the sixth transistor M6 are both turned on under the control of the output control signal EM, i.e., the first transistor M1 and the sixth transistor M6 are controlled by the same signal, and the first transistor M1 and the sixth transistor M6 are of the same type, that is, the first transistor M1 and the sixth transistor M6 are simultaneously turned on or turned off.

Figure 4:
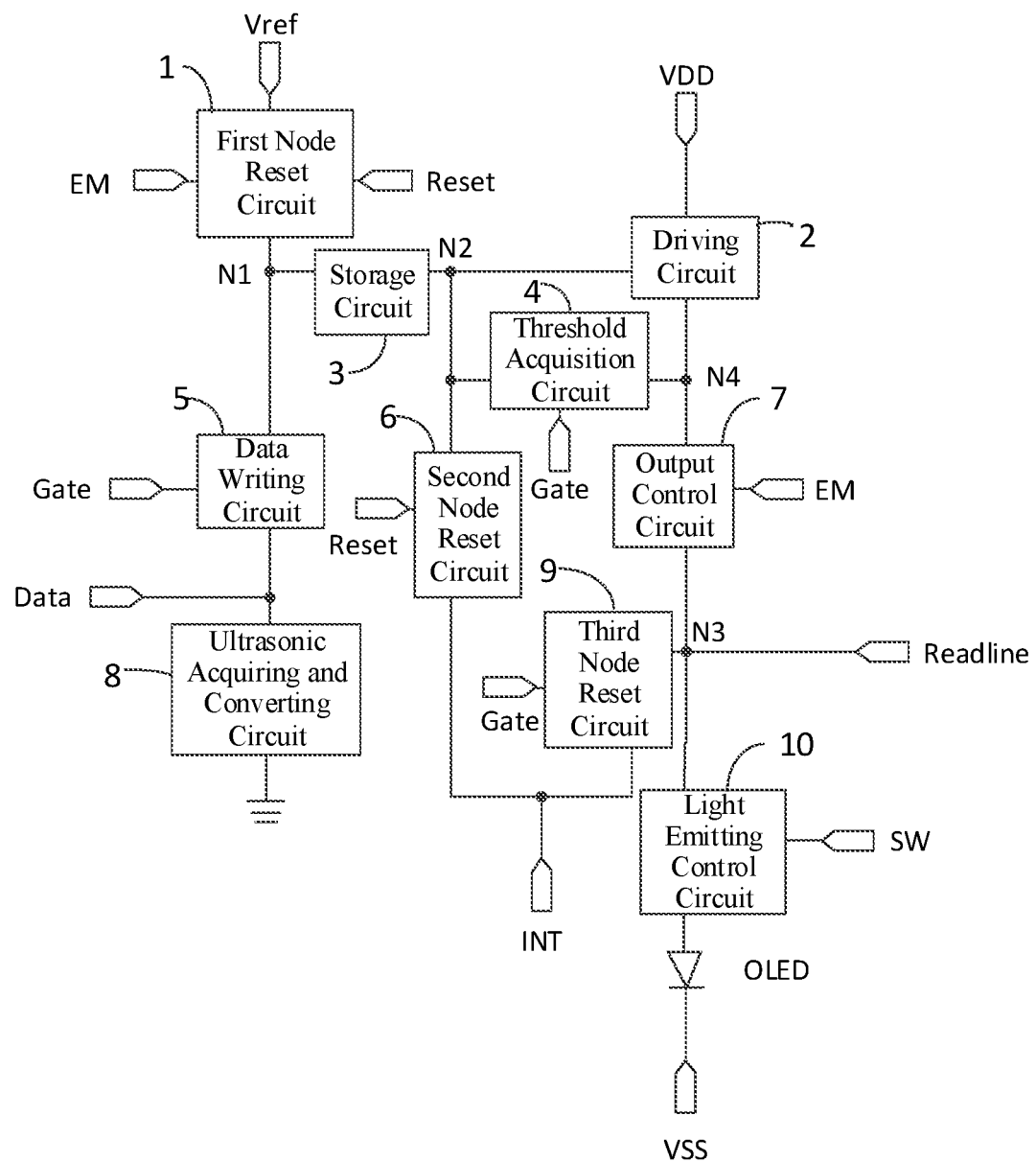
FIG. 4 is a schematic diagram of still another pixel circuit provided by at least one embodiment of the present disclosure.

For example, as shown in FIG. 4, a pixel circuit provided by some embodiments of the present disclosure further includes a light emitting control circuit 10.

The light emitting control circuit 10 is configured to provide the level of the third node N3 to the light emitting device OLED under the control of a light emitting control signal SW.

When the pixel circuit is used for the fingerprint recognition operation, the light emitting device OLED should be in a non-light emitting state, and therefore the level of the first voltage signal VSS is required to be adjusted to cause the pixel circuit to perform a light emitting operation or a fingerprint recognition operation. However, a change in the level of the first voltage signal VSS may result in an increase in power consumption. Therefore, the light emitting control circuit 10 is added to the pixel circuit provided by some embodiments of the present disclosure in order to control, by the light-emission control signal SW, the light emitting device OLED emits light or not. Therefore, the level of the first voltage signal VSS is kept at a fixed level without being changed, so that power consumption can be reduced.

Figure 5:
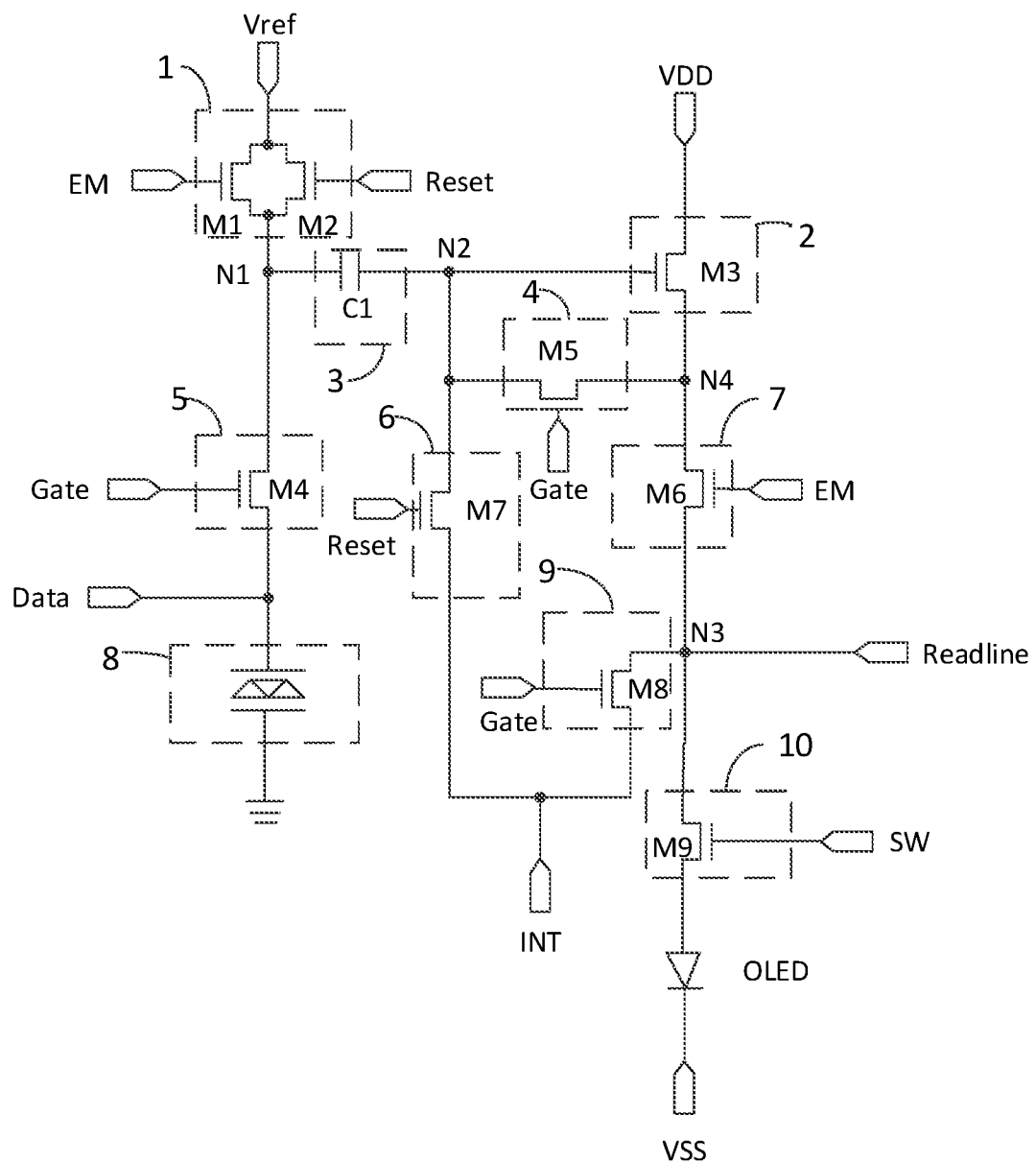
FIG. 5 is a circuit diagram of a corresponding implementation of the pixel circuit shown in FIG. 4.

For example, in the pixel circuit provided by some embodiments of the present disclosure, as shown in FIG. 5, the light emitting control circuit 10 includes a ninth transistor M9.

A gate of the ninth transistor M9 is configured to receive the light emitting control signal SW, a first electrode of the ninth transistor M9 is connected to the third node N3, and a second electrode of the ninth transistor M9 is connected to the first electrode (e.g., the anode) of the light emitting device OLED.

For example, in the pixel circuit provided by the embodiment of the present disclosure, the ninth transistor M9 may be an N-type transistor. In this case, the ninth transistor M9 is in an on state when the emission control signal SW is at a high level, and the ninth transistor M9 is in an off state when the emission control signal SW is at a low level. In addition, in some other embodiments, the ninth transistor M9 may also be a P-type transistor. In this case, the ninth transistor M9 is in an on state when the light emission control signal SW is at a low level, and the ninth transistor M9 is in an off state when the light emission control signal SW is at a high level; the embodiment of the present disclosure does not limit the type of the ninth transistor M9.

Preferably, all of the transistors mentioned in the above pixel circuit provided by the embodiments of the present disclosure may all be P-type transistors, or all of the transistors may be N-type transistors, which simplifies the manufacturing process of the pixel circuit.

The working principle of the above pixel circuit provided by the embodiment of the present disclosure will be described below in conjunction with the signal timing diagram.

The working principle of the pixel circuit provided by the embodiment of the present disclosure will be described below by taking the pixel circuits shown in FIG. 3 and FIG. 7 as an example. In the following description, 1 indicates a high level, and 0 indicates a low level.

Figure 6:
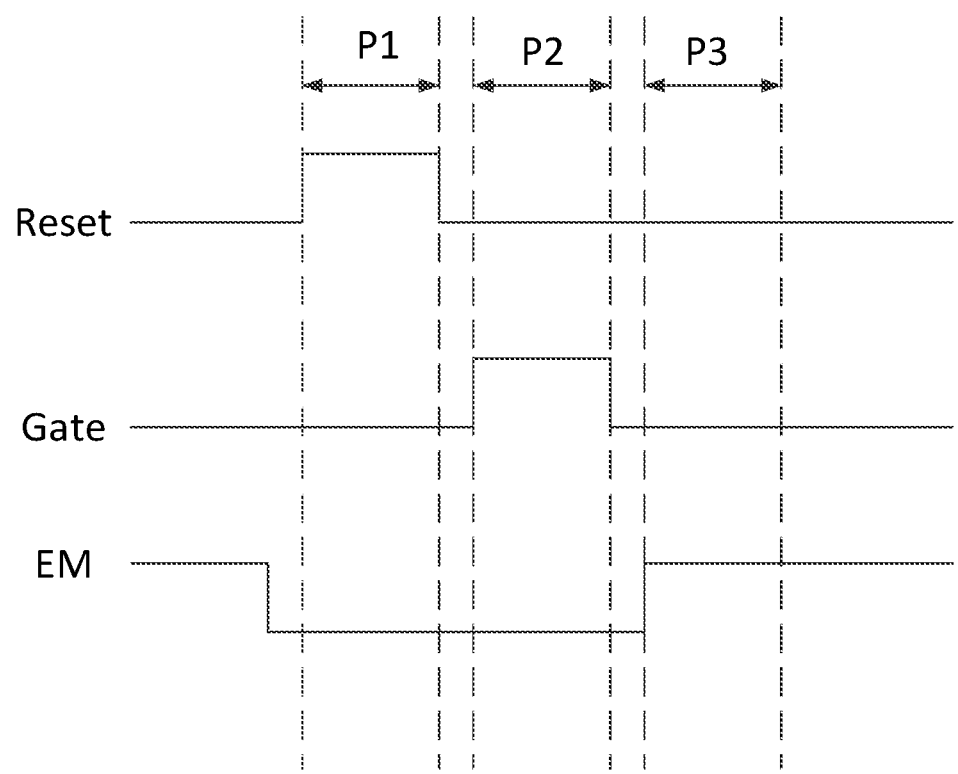
FIG. 6 is a corresponding signal timing diagram of the pixel circuit shown in FIG. 3 or FIG. 5.

In the pixel circuit shown in FIG. 3, all the transistors are N-type transistors, and each N-type transistor is turned off under the action of a low level, and is turned on under the action of a high level; the corresponding signal timing diagram is as shown in FIG. 6. Specifically, three phases P1, P2, and P3 in the signal timing diagram shown in FIG. 6 are selected.

Figure 8:
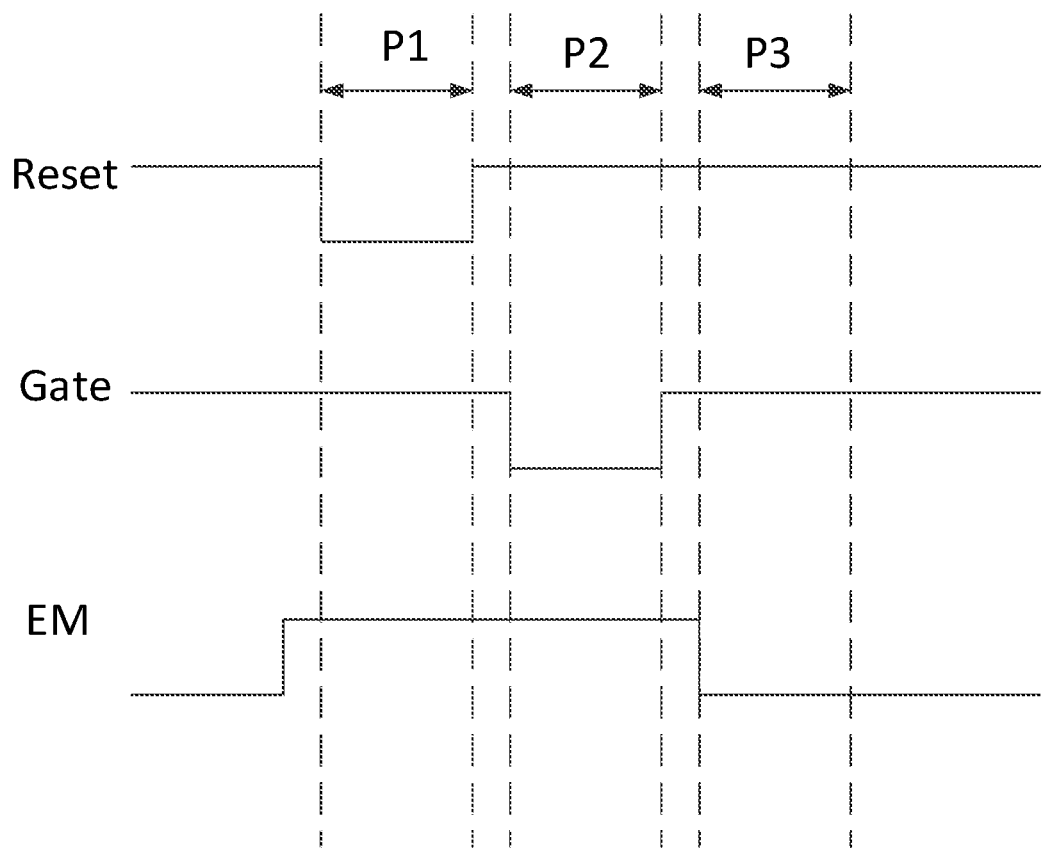
FIG. 8 is a corresponding signal timing diagram of the pixel circuit shown in FIG. 7.

In the pixel circuit shown in FIG. 7, all the transistors are P-type transistors, and each P-type transistor is turned on under the action of a low level, and is turned off under the action of a high level; the corresponding signal timing diagram is as shown in FIG. 8. Specifically, three phases P1, P2, and P3 in the signal timing diagram shown in FIG. 8 are selected.

As shown in FIG. 3 and FIG. 6, the description will be made by taking the case where the pixel circuit shown in FIG. 3 is used to drive the light emitting device OLED to emit light as an example.

During the P1 phase (the reset phase), Reset=1, Gate=0, EM=0.

Because the reset signal Reset is at a high level, the second transistor M2 and the seventh transistor M7 are turned on. The turned-on second transistor M2 provides the second voltage signal Vref to the first node N1, thereby resetting the first node N1; and the turned-on seventh transistor M7 provides the third voltage signal INT to the second node N2, thereby resetting the second node N2.

During the P2 phase (the data writing phase), Reset=0, Gate=1, EM=0.

Because the scanning signal Gate is at a high level, the fourth transistor M4, the fifth transistor M5, and the eighth transistor M8 are turned on. The turned-on fourth transistor M4 writes the data signal Data to the first node N1, that is, the level of the first node N1 is Vdata; the fourth voltage signal VDD charges the second node N2 via the turned-on third transistor M3 and the turned-on fifth transistor M5, and when the level of the second node N2 becomes VDD+Vth, the third transistor M3 is turned off, Vth is the threshold voltage of the third transistor M3; the turned-on eighth transistor M8 provides the third voltage signal INT to the third node N3, thereby resetting the third node N3.

During the P3 phase (the light emitting phase), Reset=0, Gate=0, EM=1.

Because the output control signal EM is at a high level, the first transistor M1 and the sixth transistor M6 are turned on, the level of the first node N1 becomes Vref, and the level of the second node N2 is changed from VDD+Vth to VDD+Vth-Vdata due to the bootstrapping action of the storage capacitor C1. At this time, the third transistor M3 is turned on, and the sixth transistor M6 is also turned on, and the driving current flowing through the light emitting device OLED is $I=0.5\ \mu Co\ (Vgs-Vth)^2 W/L=0.5\ \mu Co(Vref-Vdata)^2 W/L$. At this time, the first voltage signal VSS is controlled to be at a low level, so that a voltage difference is formed between the first electrode and the second electrode (the anode and the cathode) of the light emitting device OLED to cause the light emitting device OLED to emit light. In the above formula, Vgs represents the difference between the level Vg of the gate electrode and the level Vs of the source electrode of the third transistor M3, and W/L represents the width-to-length ratio of the channel of the third transistor M3, and $\mu Co$ is a constant.

As shown in FIG. 3 and FIG. 6, the description will be made by taking the case where the pixel circuit shown in FIG. 3 performs the fingerprint recognition operation as an example.

During the P1 phase (the reset phase), Reset=1, Gate=0, EM=0.

Because the reset signal Reset is at a high level, the second transistor M2 and the seventh transistor M7 are turned on. The turned-on second transistor M2 provides the second voltage signal Vref to the first node N1, thereby resetting the first node N1; and the turned-on seventh transistor M7 provides the third voltage signal INT to the second node N2, thereby resetting the second node N2.

During the P2 phase (the acquisition and conversion phase), Reset=0, Gate=1, EM=0.

Because the scanning signal Gate is at a high level, the fourth transistor M4, the fifth transistor M5, and the eighth transistor M8 are turned on. The turned-on fourth transistor M4 writes the converted electrical signal obtained after the ultrasonic acquiring and converting circuit 8 performs the conversion to the first node N1, that is, the level of the first node N1 is V8; the fourth voltage signal VDD charges the second node N2 via the turned-on third transistor M3 and the turned-on fifth transistor M5, and when the level of the second node N2 becomes VDD+Vth, the third transistor M3 is turned off, Vth is the threshold voltage of the third transistor M3; the eighth transistor M8 provides the third voltage signal INT to the third node N3, thereby resetting the third node N3.

During the P3 phase (the output phase), Reset=0, Gate=0, EM=1.

Because the output control signal EM is at a high level, the first transistor M1 and the sixth transistor M6 are turned on, the level of the first node N1 becomes Vref, and the level of the second node N2 is changed from VDD+Vth to VDD+Vth+Vref-V8 due to the bootstrapping action of the storage capacitor C1. At this time, the third transistor M3 is turned on, and the sixth transistor M6 is also turned on, and the current provided to the reading signal line Readline is $I=0.5\ \mu Co\ (Vgs-Vth)^2 W/L\ 0.5\ \mu Co\ (Vref-V8)^2 W/L$, for example, the current obtained by the reading signal line Readline is then provided to the data processing circuit at the back end for further processing, thereby obtaining a fingerprint image to implement the fingerprint recognition function. In the above formula, Vgs represents the difference between the level Vg of the gate electrode and the level Vs of the source electrode of the third transistor M3, and W/L represents the width-to-length ratio of the channel of the third transistor M3, and $\mu Co$ is a constant.

When the pixel circuit is used for fingerprint recognition, the level of the first voltage signal VSS is the same as or close to the level of the fourth voltage signal VDD, so that a voltage difference cannot be formed between the first pole and the second pole (anode and cathode) of the light emitting device OLED, and thus the light emitting device OLED does not emit light.

As shown in FIG. 7 and FIG. 8, the description will be made by taking the case that the pixel circuit shown in FIG. 7 is used to drive the light emitting device OLED to emit light as an example.

During the P1 phase (the reset phase), Reset=0, Gate=1, EM=1.

Because the reset signal Reset is at a low level, the second transistor M2 and the seventh transistor M7 are turned on. The turned-on second transistor M2 provides the second voltage signal Vref to the first node N1, thereby resetting the first node N1; and the turned-on seventh transistor M7 provides the third voltage signal INT to the second node N2, thereby resetting the second node N2.

During the P2 phase (the data writing phase), Reset=1, Gate=0, EM=1.

Because the scanning signal Gate is at a low level, the fourth transistor M4, the fifth transistor M5, and the eighth transistor M8 are turned on. The turned-on fourth transistor M4 writes the data signal Data to the first node N1, that is, the level of the first node N1 is Vdata; the fourth voltage signal VDD charges the second node N2 via the turned-on third transistor M3 and the turned-on fifth transistor M5, and when the level of the second node N2 becomes VDD+Vth, the third transistor M3 is turned off, Vth is the threshold voltage of the third transistor M3; the turned-on eighth transistor M8 provides the third voltage signal INT to the third node N3, thereby resetting the third node N3.

During the P3 phase, Reset=1, Gate=1, EM=0.

Because the output control signal EM is at a low level, the first transistor M1 and the sixth transistor M6 are turned on, the level of the first node N1 becomes Vref, and the level of the second node N2 is changed from VDD+Vth to VDD+Vth+Vref-Vdata due to the bootstrapping action of the storage capacitor C1. At this time, the third transistor M3 is turned on, and the sixth transistor M6 is also turned on, and the driving current flowing through the light emitting device OLED is I=0.5 $\mu Co(Vgs-Vth)^2 W/L$=0.5 $\mu Co$ $(Vref-Vdata)^2 W/L$. At this time, the first voltage signal VSS is controlled to be at a low level, so that a voltage difference is formed between the first electrode and the second electrode (the anode and the cathode) of the light emitting device OLED to cause the light emitting device OLED to emit light. In the above formula, Vgs represents the difference between the level Vg of the gate electrode and the level Vs of the source electrode of the third transistor M3, and W/L represents the width-to-length ratio of the channel of the third transistor M3, and $\mu Co$ is a constant.

As shown in FIG. 7 and FIG. 8, the description will be made by taking the case where the pixel circuit shown in FIG. 7 performs the fingerprint recognition operation as an example.

During the P1 phase (the reset phase), Reset=0, Gate=1, EM=1.

Because the reset signal Reset is at a low level, the second transistor M2 and the seventh transistor M7 are turned on. The turned-on second transistor M2 provides the second voltage signal Vref to the first node N1, thereby resetting the first node N1; and the turned-on seventh transistor M7 provides the third voltage signal INT to the second node N2, thereby resetting the second node N2.

During the P2 phase (the acquisition conversion phase), Reset=1, Gate=0, EM=1.

Because the scanning signal Gate is at a low level, the fourth transistor M4, the fifth transistor M5, and the eighth transistor M8 are turned on. The turned-on fourth transistor M4 writes the converted electrical signal obtained after the ultrasonic acquiring and converting circuit 8 performs the conversion to the first node N1, that is, the level of the first node N1 is V8; and the fourth voltage signal VDD charges the second node N2 via the turned-on third transistor M3 and the turned-on fifth transistor M5, and when the level of the second node N2 becomes VDD+Vth, the third transistor M3 is turned off, Vth is the threshold voltage of the third transistor M3; the turned-on eighth transistor M8 provides the third voltage signal INT to the third node N3, thereby resetting the third node N3.

During the P3 phase (the output phase), Reset=1, Gate=1, EM=0.

Because the output control signal EM is at a low level, the first transistor M1 and the sixth transistor M6 are turned on, the level of the first node N1 becomes Vref, and the level of the second node N2 is changed from VDD+Vth to VDD+Vth+Vref-V8 due to the bootstrap action of the storage capacitor C1. At this time, the third transistor M3 is turned on, and the sixth transistor M6 is also turned on, and the current provided to the reading signal line Readline is I=0.5 $\mu Co(Vgs-Vth)^2 W/L$=0.5 $\mu Co(Vref-V8)^2 W/L$, for example, the current obtained by the reading signal line Readline is then provided to the data processing circuit at the back end for further processing, thereby obtaining a fingerprint image to implement the fingerprint recognition function. In the above formula, Vgs represents the difference between the level Vg of the gate electrode and the level Vs of the source electrode of the third transistor M3, and W/L represents the width-to-length ratio of the channel of the third transistor M3, and $\mu Co$ is a constant.

When the pixel circuit is used for fingerprint recognition, the level of the first voltage signal VSS is the same as or close to the level of the fourth voltage signal VDD, so that a voltage difference cannot be formed between the first pole and the second pole (anode and cathode) of the light emitting device OLED, and thus the light emitting device OLED does not emit light.

Figure 9:
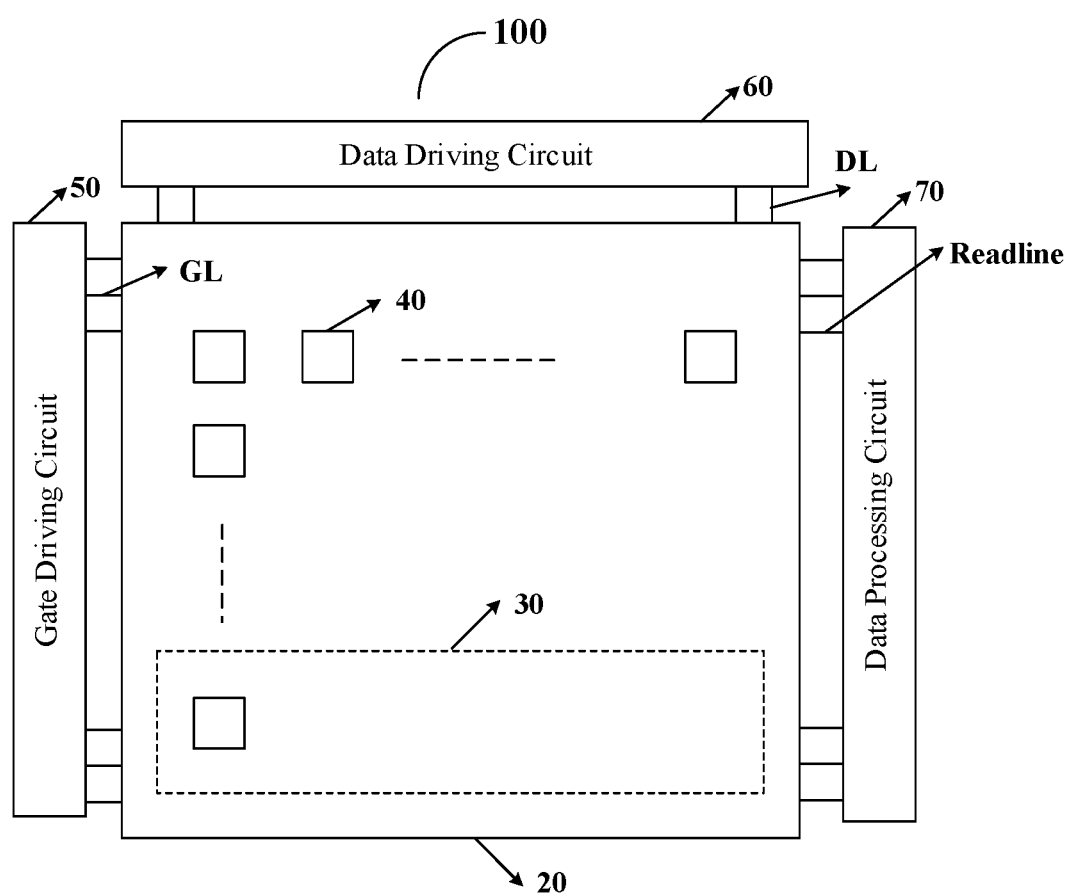
FIG. 9 is a schematic diagram of a display panel provided by at least one embodiment of the present disclosure.

Based on the same inventive concept, at least one embodiment of the present disclosure further provides a display panel 100. As shown in FIG. 9, the display panel 100 includes a display area 20 in which a plurality of pixel units 40 arranged in an array are disposed, and each pixel unit 40 is provided with a pixel circuit. For example, the pixel circuit may adopt any of the pixel circuits provided by the embodiments of the present disclosure.

The display area 20 includes a fingerprint recognition area 30, and the pixel circuit in the pixel unit 40 in the fingerprint recognition area 30 needs to adopt any of the pixel circuits provided by the embodiments of the present disclosure, so that the fingerprint recognition area 30 may have both a light emitting function and a fingerprint recognition function. It should be noted that the pixel unit 40 in the area other than the fingerprint recognition area 30 in the display area 20 may not adopt the pixel circuit provided by the embodiment of the present disclosure, but adopt other conventional pixel circuits having a light emitting function.

In addition, the fingerprint recognition area 30 shown in FIG. 9 is only an example, and the embodiment of the present disclosure does not limit the size and position of the fingerprint recognition area 30. For example, in some embodiments, all of the display areas 20 may be used as a fingerprint recognition area, so that the user can touch any area in the display area 20 of the display panel to perform fingerprint recognition, thereby improving the utility and convenience of the display panel.

As shown in FIG. 9, the display panel 100 provided by the embodiment of the present disclosure further includes a scanning signal line GL, a data signal line DL, and a reading signal line Readline. The scanning signal line GL is configured to provide the scanning signal Gate, the data signal line DL is configured to provide the data signal Data, and the reading signal line Readline is configured to read the recognition signal. For example, the reading signal line Readline is connected to the third node N3 in the pixel circuit to read the recognition signal.

For example, as shown in FIG. 9, the display panel 100 further includes a gate driving circuit 50, a data driving circuit 60, and a data processing circuit 70. The gate driving circuit 50 is electrically connected to the pixel circuit in the pixel unit 40 through the scanning signal line GL, so as to provide the scanning signal Gate. The data driving circuit 60 is electrically connected to the pixel circuit in the pixel unit 40 through the data signal line DL, so as to provide the data signal Data. The data processing circuit 70 is electrically connected to the pixel circuit in the pixel unit 40 by the reading signal line Readline, so as to read the recognition signal. It should be noted that the display panel provided by the embodiment of the present disclosure may integrate the data processing circuit 70 with the data driving circuit 60, or integrate the data processing circuit 70 with the gate driving circuit 50, which is not limited by the embodiment of the present disclosure.

The technical effect of the display panel provided by the embodiment of the present disclosure may refer to the corresponding description of the pixel circuit in the above embodiment, which will not be repeated herein.

At least one embodiment of the present disclosure further provides a display device, which includes any of the display panels provided by the embodiments of the present disclosure. The display device can be any product or component having a display function, such as a liquid crystal panel, a liquid crystal television, a display, an OLED panel, an OLED television, an electronic paper, a mobile phone, a tablet computer, a notebook computer, a digital photo frame, a navigator, etc.

The technical effect of the display device provided by the embodiment of the present disclosure may refer to the corresponding description of the pixel circuit in the above embodiment, which will not be repeated herein.

At least one embodiment of the present disclosure also provides a method for driving the pixel circuit, the method including the following operations.

During the reset phase, causing the first node reset circuit 1 to provide the second voltage signal Vref to the first node N1 under the control of the reset signal Reset, and causing the second node reset circuit 6 to provide the third voltage signal INT to the second node N2 under the control of the reset signal Reset.

During the acquisition and conversion phase, causing the data writing circuit 5 to provide the converted electric signal obtained by the ultrasonic acquiring and converting circuit 8 to the first node N1, causing the threshold acquisition circuit 4 to write the threshold voltage of the driving circuit 2 to the second node N2, and causing the third node reset circuit 9 to provide the third voltage signal INT to the third node N3 under the control of the scanning signal Gate.

During the output phase, causing the first node reset circuit 1 to provide the second voltage signal Vref to the first node N1 under the control of the output control signal EM, causing the driving circuit 2 and the output control circuit 7 to be turned on, providing, by the driving circuit 2, the recognition signal obtained based on the converted electrical signal to the fourth node N4, and providing, by the output control circuit 7, the level of the fourth node N4 to the third node N3.

It should be noted that, for a detailed description and technical effects of the driving circuit of the above pixel circuit, reference may be made to the corresponding description of the pixel circuit in the above embodiment, and details are not described herein again.

At least one embodiment of the present disclosure also provides a method for driving the display panel, which includes causing a pixel circuit in the fingerprint recognition area 30 to respectively perform a display operation and a fingerprint recognition operation during different time periods. For example, the pixel circuit in the fingerprint recognition area 30 may be caused to perform the fingerprint recognition operation during the intervals between the display operations, so that the display panel can have both the display function and the fingerprint recognition function.

What are described above is related to the illustrative embodiments of the disclosure only and not limitative to the scope of the disclosure; the scopes of the disclosure are defined by the accompanying claims.

What is claimed is:

1. A pixel circuit, comprising: a data writing circuit, an ultrasonic acquiring and converting circuit, a storage circuit, a driving circuit, an output control circuit, and a light emitting device; wherein
    the ultrasonic acquiring and converting circuit is configured to convert a received ultrasonic signal into a converted electrical signal, and to provide the converted electrical signal to the data writing circuit;
    the data writing circuit is configured to provide the converted electrical signal obtained by the ultrasonic acquiring and converting circuit or a data signal to a first node under a control of a scanning signal;
    the driving circuit is configured to provide a driving signal to a fourth node under a control of a level of a second node, wherein the driving signal is used for driving the light emitting device to emit light, or to provide a recognition signal obtained according to the converted electrical signal to the fourth node under the control of the level of the second node;
    the storage circuit is configured to maintain a voltage difference between the first node and the second node stable;
    the output control circuit is configured to provide a level of the fourth node to a third node under a control of an output control signal, and the third node is configured to output the recognition signal; and
    a first electrode of the light emitting device is configured to be connected to the third node, and a second electrode of the light emitting device is configured to receive a first voltage signal.

2. The pixel circuit according to claim 1, wherein the ultrasonic acquiring and converting circuit is connected to the data writing circuit, the data writing circuit is connected to the first node, the storage circuit is connected to the first node and the second node, the driving circuit is connected to the second node and the fourth node, and the output control circuit is connected to the fourth node and the third node,
    the first voltage signal is configured to cause the light emitting device not to emit light, in a case where the ultrasonic acquiring and converting circuit provides the converted electrical signal to the data writing circuit.

3. The pixel circuit according to claim 1, further comprising a threshold acquisition circuit, wherein
    the threshold acquisition circuit is connected to the second node and the fourth node, and is configured to provide the level of the fourth node to the second node under a control of the scanning signal.

4. The pixel circuit according to claim 3, further comprising a first node reset circuit, a second node reset circuit, and a third node reset circuit, wherein
    the first node reset circuit is connected to the first node, and is configured to provide a second voltage signal to the first node under a control of the output control signal or a reset signal,
    the second node reset circuit is connected to the second node, and is configured to provide a third voltage signal to the second node under a control of the reset signal, and
    the third node reset circuit is connected to the third node, and is configured to provide the third voltage signal to the third node under a control of the scanning signal.

5. The pixel circuit according to claim 4, wherein the first node reset circuit comprises a first transistor and a second transistor;
- a gate electrode of the first transistor is configured to receive the output control signal, a first electrode of the first transistor is configured to receive the second voltage signal, and a second electrode of the first transistor is connected to the first node; and
- a gate electrode of the second transistor is configured to receive the reset signal, a first electrode of the second transistor is configured to receive the second voltage signal, and a second electrode of the second transistor is connected the first node.

6. The pixel circuit according to claim 4, wherein the second node reset circuit comprises a seventh transistor;
- a gate electrode of the seventh transistor is configured to receive the reset signal, a first electrode of the seventh transistor is configured to receive the third voltage signal, and a second electrode of the seventh transistor is connected to the second node.

7. The pixel circuit according to claim 4, wherein the third node reset circuit comprises an eighth transistor;
- a gate electrode of the eighth transistor is configured to receive the scanning signal, a first electrode of the eighth transistor is configured to receive the third voltage signal, and a second electrode of the eighth transistor is connected to the third node.

8. The pixel circuit according to claim 4, further comprising a light emitting control circuit, wherein
- the light emitting control circuit is configured to provide a level of the third node to the light emitting device under a control of a light emitting control signal.

9. The pixel circuit according to claim 8, wherein the light emitting control circuit comprises a ninth transistor;
- a gate electrode of the ninth transistor is configured to receive the light emitting control signal, a first electrode of the ninth transistor is connected to the third node, and a second electrode of the ninth transistor is connected to the first electrode of the light emitting device.

10. The pixel circuit according to claim 3, wherein the threshold acquisition circuit comprises a fifth transistor;
- a gate electrode of the fifth transistor is configured to receive the scanning signal, a first electrode of the fifth transistor is connected to the fourth node, and a second electrode of the fifth transistor is connected to the second node.

11. The pixel circuit according to claim 1, wherein the data writing circuit comprises a fourth transistor;
- a gate electrode of the fourth transistor is configured to receive the scanning signal, a first electrode of the fourth transistor is connected to the ultrasonic acquiring and converting circuit and configured to receive the data signal, and a second electrode of the fourth transistor is connected to the first node.

12. The pixel circuit according to claim 1, wherein the storage circuit comprises a storage capacitor,
- a first electrode of the storage capacitor is connected to the first node, and a second electrode of the storage capacitor is connected to the second node.

13. The pixel circuit according to claim 1, wherein the driving circuit comprises a third transistor;
- a gate electrode of the third transistor is connected to the second node, a first electrode of the third transistor is configured to receive a fourth voltage signal, and a second electrode of the third transistor is connected to the fourth node.

14. The pixel circuit according to claim 1, wherein the output control circuit comprises a sixth transistor;
- a gate electrode of the sixth transistor is configured to receive the output control signal, a first electrode of the sixth transistor is connected to the fourth node, and a second electrode of the sixth transistor is connected to the third node.

15. A display panel, comprising a display area, wherein
- the display area comprises a fingerprint recognition area which is provided with the pixel circuit according to claim 1 is disposed.

16. The display panel according to claim 15, further comprising a scanning signal line, a data signal line, and a reading signal line, wherein
- the scanning signal line is configured to provide the scanning signal, the data signal line is configured to provide the data signal, and the reading signal line is configured to read the recognition signal.

17. A method for driving a pixel circuit, wherein
- the pixel circuit comprises: a data writing circuit, an ultrasonic acquiring and converting circuit, a storage circuit, a driving circuit, an output control circuit, and a light emitting device;
- the ultrasonic acquiring and converting circuit is configured to convert a received ultrasonic signal into a converted electrical signal, and to provide the converted electrical signal to the data writing circuit;
- the data writing circuit is configured to provide the converted electrical signal obtained by the ultrasonic acquiring and converting circuit or a data signal to a first node under a control of a scanning signal;
- the driving circuit is configured to provide a driving signal to a fourth node under a control of a level of a second node, wherein the driving signal is used for driving the light emitting device to emit light; or to provide a recognition signal obtained according to the converted electrical signal to the fourth node under the control of the level of the second node;
- the storage circuit is configured to maintain a voltage difference between the first node and the second node stable;
- the output control circuit is configured to provide a level of the fourth node to a third node under a control of an output control signal, and the third node is configured to output the recognition signal; and
- a first electrode of the light emitting device is configured to be connected to the third node, and a second electrode of the light emitting device is configured to receive a first voltage signal,
- the method comprises:
- during an acquisition and conversion phase, causing the data writing circuit to provide the converted electrical signal obtained by the ultrasonic acquiring and converting circuit to the first node; and
- during an output phase, causing the driving circuit and the output control circuit to be turned on, providing, by the driving circuit, the recognition signal obtained according to the converted electrical signal to the fourth node, and providing, by the output control circuit, the level of the fourth node to the third node.

18. The method for driving the pixel circuit according to claim 17, wherein the pixel circuit further comprises a threshold acquisition circuit, a first node reset circuit, a second node reset circuit, and a third node reset circuit, wherein
- the threshold acquisition circuit is connected to the second node and the fourth node, and is configured to provide the level of the fourth node to the second node under a control of the scanning signal, the first node reset circuit is connected to the first node, and is configured to provide a second voltage signal to the first node under a control of the output control signal or a reset signal, the second node reset circuit is connected to the second node, and is configured to provide a third voltage signal to the second node under a control of the reset signal, and the third node reset circuit is connected to the third node, and is configured to provide the third voltage signal to the third node under a control of the scanning signal, the method further comprises:

during a reset phase, causing the first node reset circuit to provide the second voltage signal to the first node under the control of the reset signal, and causing the second node reset circuit to provide the third voltage signal to the second node under the control of the reset signal;

during the acquisition and conversion phase, causing the threshold acquisition circuit to write a threshold voltage of the driving circuit to the second node, and causing the third node reset circuit to provide the third voltage signal to the third node under the control of the scanning signal; and during the output phase, causing the first node reset circuit to provide the second voltage signal to the first node under the control of the output control signal.

19. A pixel circuit, comprising: an ultrasonic acquiring and converting circuit, a first transistor, a second transistor, a third transistor, a fourth transistor, a fifth transistor, a six transistor, a seventh transistor, an eighth transistor, a storage capacitor and a light emitting device, wherein the ultrasonic acquiring and converting circuit is configured to convert a received ultrasonic signal into a converted electrical signal, and to provide the converted electrical signal to the fourth transistor;

a gate electrode of the first transistor is configured to receive an output control signal, a first electrode of the first transistor is configured to receive a second voltage signal, a second electrode of the first transistor is connected to the first node, and the first transistor is configured to provide the second voltage signal to the first node under a control of the output control signal;

a gate electrode of the second transistor is configured to receive a reset signal, a first electrode of the second transistor is configured to receive the second voltage signal, a second electrode of the second transistor is connected the second node, and the second transistor is configured to provide the second voltage signal to the first node under a control of the reset signal;

a gate electrode of the third transistor is connected to a second node, a first electrode of the third transistor is configured to receive a fourth voltage signal, a second electrode of the third transistor is connected to a fourth node, and the third transistor is configured to provide a driving signal to the fourth node under a control of a level of a second node, wherein the driving signal is used for driving the light emitting device to emit light; or to provide a recognition signal obtained according to the converted electrical signal to the fourth node under the control of the level of the second node;

a gate electrode of the fourth transistor is configured to receive a scanning signal, a first electrode of the fourth transistor is connected to the ultrasonic acquiring and converting circuit and configured to receive the data signal, a second electrode of the fourth transistor is connected to the first node, and the fourth transistor is configured to provide the converted electrical signal obtained by the ultrasonic acquiring and converting circuit or a data signal to the first node under a control of the scanning signal;

a gate electrode of the fifth transistor is configured to receive the scanning signal, a first electrode of the fifth transistor is connected to the fourth node, a second electrode of the fifth transistor is connected to the second node, and the fifth transistor is configured to provide a level of the fourth node to the second node under a control of the scanning signal;

a gate electrode of the sixth transistor is configured to receive the output control signal, a first electrode of the sixth transistor is connected to the fourth node, a second electrode of the sixth transistor is connected to a third node, the sixth transistor is configured to provide the level of the fourth node to the third node under a control of the output control signal, and the third node is configured to output the recognition signal;

a gate electrode of the seventh transistor is configured to receive the reset signal, a first electrode of the seventh transistor is configured to receive a third voltage signal, a second electrode of the seventh transistor is connected to the second node, and the seventh transistor is configured to provide the third voltage signal to the second node under a control of the reset signal;

a gate electrode of the eighth transistor is configured to receive the scanning signal, a first electrode of the eighth transistor is configured to receive the third voltage signal, a second electrode of the eighth transistor is connected to the third node, and the eighth transistor is configured to provide the third voltage signal to the third node under a control of the scanning signal; and a first electrode of the storage capacitor is connected to the first node, a second electrode of the storage capacitor is connected to the second node, and the storage capacitor is configured to maintain a voltage difference between the first node and the second node stable.

* * * * *